Patented Jan. 13, 1948

2,434,243

UNITED STATES PATENT OFFICE 2,434,243

BITUMINOUS EMULSIONS

Sixten Magnus Hjelte, Stockholm, Sweden

No Drawing. Application August 30, 1944, Serial No. 552,017. In Sweden July 31, 1942

23 Claims. (Cl. 106—123)

This invention relates to improved emulsions, suitable for paving, flooring, roofing, coating, insulation, binding, and other purposes.

More particularly, the invention relates to aqueous emulsions of the type comprising bituminous material, a finely subdivided, solid, inorganic substance and a protective colloid, and in which water constitutes the external phase, the said bituminous substance and said subdivided, solid inorganic substance constituting the internal phases.

It is well known that emulsions of the foregoing type are, in general, desirable for paving, flooring, roofing and other purposes. The inorganic component in emulsions hitherto known generally consists of calcium carbonate which may be employed either in the form of a finely ground limestone or in the form of a chemically precipitated calcium carbonate which is of a considerably finer grain than it is practicable to attain when employing a mechanically subdivided product.

Experience has shown that the coating which is formed after the application and drying of these emulsions, has certain inherent disadvantages. One of these disadvantages is that the coating will not remain stable. It would seem that this instability is due to the fact that acids are formed in the bituminous material comprising, for example, tar asphalt and the like owing to the effect of sunlight and other atmospheric conditions, and these acids tend to make the asphalt or tar brittle. The admixture of neutralizing agents to the emulsion for improving the stability of the coating formed therewith will entail a number of disadvantages. It is worthy of mention that calcium carbonate is itself also a neutralizing agent for strong acids but has only a very slightly neutralizing effect on weak organic acids present in or formed in bituminous materials such as asphalt and tar. The admixture of calcium hydroxide for neutralizing purposes leaves much to be desired, for in such cases a violent neutralization of organic acids will take place where few grains of calcium oxide are situated but no neutralization will occur where the grains of calcium carbonate are situated. For example, on the basis of a 5% addition of calcium oxide (based on the calcium carbonate) to the bituminous material and assuming the same particle size and an even distribution of both calcium oxide and calcium carbonate throughout the entire coating formed from the emulsion (assumptions which no doubt could only approximately be realized in practice), it is obvious that there will be only about one grain of the calcium oxide to 19 grains of the calcium carbonate. Thus there will occur a violent (possibly even too violent) neutralization around one grain of the solid inorganic material, but no neutralization around the remaining 19 grains of said solid material.

An additional disadvantage of powdered calcium oxide or hydroxide as additives is that these materials tend to absorb carbon dioxide from the atmosphere and become transformed into the corresponding carbonate, thereby losing their neutralizing power for the weak organic acids present and/or formed in the bituminous coating.

A further disadvantage arises when attempts are made to achieve a stronger neutralization by increasing the amount of neutralizing agents in the emulsion, because, although it is admittedly easier to produce the emulsion and make the latter more stable by so doing, the emulsion will then not be able to break down with adequate ease and immediately adhere to the surface to which it is supplied that the coating formed will not be washed away by a substantially trickling, spray or flow of water, e. g., rain. Such an emulsion with a great surplus of alkali is not capable of adhering to moist surfaces, which is certainly a disadvantage when the emulsion is intended for coating purposes of damp foundation walls, for example. Thus the ideal emulsion is one that will dry immediately after the application thereof and form a stable, cohesive waterproof and weather-proof surface. As regards the finely subdivided inorganic substance in the emulsion, it will be apparent from the above that the substance shall have a mild or slight neutralizing power.

One object of the invention is to provide an emulsion having the abovementioned properties.

Another object is to provide a bituminous emulsion which can advantageously replace pure asphalt, tar and the like, as material for paving, flooring, proofing, coating, and related uses.

A further object of the invention is to provide an emulsion which may advantageously be used as an adhesive for paper and the like, in forming laminated paper and analogous products.

The emulsion according to the invention comprises a bituminous material, a solid inorganic substance and a slightly alkaline substance substantially homogeneously incorporated therewith; e. g., a double salt of calcium carbonate and sodium carbonate. Such a slightly alkaline substance may be obtained, if the said inorganic substance and double salt are co-precipitated so that every grain of the former will contain at least an effective amount of the latter.

Precipitated calcium carbonate is preferably used as the finely subdivided solid inorganic substance in the emulsion according to the invention, the precipitation preferably being performed, for example, by causticization of a soda solution by means of lime, under such conditions that at least an effective quantity of the above mentioned double salt is formed, homogeneously distributed throughout the precipitated calcium carbonate. For a more detailed description of a double salt of calcium carbonate and sodium carbonate and its formation, I may refer, for example, to an article by O. Bütschli in "Journal für Praktische Chemie," vol. 75, page 556, and an article by R. Wegscheider in "Liebigs Annalen," vol. 351, page 87, and a review thereof by J. W. Mellor, "A Comprehensive Treatise of Inorganic and Theoretical Chemistry," vol. III, 1928, pages 844 and 845.

Although the double salt referred to is already known per se, prior to this invention it has never been disclosed that through its relatively weak alkaline action it is excellently adapted as a neutralizing agent for the relatively weak organic acids present and/or formed in bituminous materials such as asphalt and tar, particularly when it has been precipitated in homogeneous admixture with calcium carbonate.

While it is not desired that the invention be limited to any particular theory of operation, research indicates that the process going on in a bituminous emulsion according to my invention when used as a coating may be explained substantially as follows, having reference to the presence of the dry crystalline double salt for purposes of illustration:

Under the influence of weathering agencies such as sunlight and air, relatively weak organic acids are slowly but continuously formed in the asphalt or tar or other bituminous material of the applied emulsion. These acids split a portion of the double salt $CaCO_3.Na_2CO_3.2H_2O$ and are neutralized as soon as they are formed, by the alkaline component $Na_2CO_3$. These acids consequently are destroyed in situ before they have an opportunity of exerting any detrimental action on the bituminous material, the emulsion thereby retaining its stability over a greatly increased period. The double salt $CaCO_3.Na_2CO_3.2H_2O$ has a relatively low solubility in water and is therefore not washed out of the bituminous coating remaining after the drying of the emulsion when the latter is applied to roads, roofs, or similar places where it is subjected to atmospheric weathering agencies. The bituminous composition accordingly maintains its stability even though it be subjected to the leaching action of rain and snow.

When precipitated calcium carbonate is employed as the finely subdivided solid inorganic component of the emulsion according to the invention, it may be produced by causticizing a specially prepared soda solution by means of milk of lime, under definite conditions. As thus produced, however, said component may in many instances be too costly for practicable purposes. It is therefore of greatest importance to the practice of this invention, from a practical standpoint that a suitable precipitated calcium carbonate containing a certain small percentage of the neutralizing double salt mentioned above be available as a cheap waste product. It has fortunately been discovered that the waste or by-product obtained in the form of a precipitate of calcium carbonate in the causticization of soda by milk of lime in preparing the cooking liquor used in the soda or sulphate process of paper pulp making is ideally suited for use in the bituminous compositions of this invention. Lime sludge from these pulp making processes is precipitated at a high temperature from a concentrated solution of soda which is causticized, whereupon the double salt of sodium carbonate and calcium carbonate is formed. The double salt is formed in any case when calcium carbonate is suspended in a warm solution of sodium hydroxide and sodium carbonate, followed by cooling, which is what takes place in the causticization process during the above mentioned paper pulp manufacture.

While it may be true that this waste product, viz., the lime sludge from the soda or sulphate processes of paper pulp making, contains an additional small percentage of other inorganic soluble compounds which may not have been completely washed out, these last named impurities are not harmful if they are carried over into the bituminous composition. On the other hand this waste product is completely free of organic impurities such as would have a detrimental effect on the properties of the emulsion and the coating formed on application of the emulsion. The method by which paper pulp lime sludge is obtained during the course of paper pulp manufacture is itself a guarantee of the complete absence of harmful organic impurities therefrom. As indicative of this fact the preparation of a sulphate paper lime sludge will now be cited.

Black liquor which has been separated from the cooked paper pulp is evaporated until its contents of organic substance as well as of salts of sodium, sulphur, and the like, range from approximately 50 to 80%. In this form the evaporated black liquor is taken to a furnace where it is first dried out completely, then burnt in the furnace, the organic substances acting as an excellent fuel. Salt cake is added, and the remaining solids of the organic substances are converted mainly to sodium carbonate and sodium sulphide, and melted. In a red hot condition the smelt flows to a dissolving tank, where the smelt is completely dissolved. Causticizing lime is then added, and the precipitate (or paper pulp lime sludge) obtained is practically pure carbonate of lime containing a small amount of inorganic double salts of calcium carbonate and sodium carbonate, but no organic substances whatever.

Generally speaking, the double salt content of paper pulp lime sludge will vary from approximately 1 to 5% by weight, with approximately 2.5% as an average value. For example Lassenius, in Svensk Papperstidning, 41, 40 (1938), gives the insoluble alkali content obtained by analyses of paper pulp lime sludge as varying from 1.0 to 2.4%, analyzed as $Na_2SO_4$. Calculated as $CaCO_3.Na_2CO_3.2H_2O$, this would correspond to a range of approximately 1.7 to 4.1% for the content of the relatively insoluble double salt. Day, in Paper Trade Journal, 105:I, 108 (1937), states that he has found that the not-readily washable alkali remaining in paper pulp lime sludge amounts to 1.8%, calculated as $Na_2SO_4$ (salt cake) on the dry paper pulp lime sludge. Calculated as $CaCO_3.Na_2CO_3.2H_2O$, this alkali would, according to Day, correspond to a double salt content of approximately 3.1%.

It will be understood that the precipitation of the finely subdivided calcium carbonate in admixture with double salt may be so regulated as to vary the content of the calcium carbonate-sodium carbonate double salt homogeneously incorporated therewith. Thus, in any instance where the double salt content may not be as high as desired for the purpose at hand, the double salt content may be increased if desired by suitably changing the conditions under which the double salt is formed.

The particle sizes of the paper pulp lime sludge may range from 0.1 to 2 mu., and are generally less than 1 mu. in diameter. Within this range they are also characterized by a relatively high uniformity in size. This is to be contrasted with mechanically powdered lime-stone, employed for similar purposes, wherein the greater portion of the particles may exceed 10 mu. and usually reach 12 to 15 mu. in diameter, without however possessing relative uniformity of particle size. On the other hand, the individual particle size of beet sugar lime sludge which is not used in the emulsion according to this invention may be of the same order of magnitude as that of the paper pulp lime sludge employed in accordance with the present invention, but due to the presence of the organic matter in the former (which may be present to an extent of as high as 20%) the individual particles thereof are generally coalesced into aggregates or flocs, thus preventing any comparable degree of homogeneity.

The bituminous material used in the emulsion according to the invention may comprise one or more of the following substances: Asphalt, tar and pitchy residues obtained from distilling or fractioning tall-oil or liquid resin obtained from waste liquors in the alkaline processes of paper pulp manufacture. The emulsion preferably comprises said pitchy residue.

In this conjunction it might be useful to describe by way of example how the said pitchy residue may be produced. It is well known that a so called black liquor is obtained after the cooking operation in the soda or sulphate processes of paper pulp manufacture which liquor is thereafter concentrated in a so called multiple evaporator. The evaporator liquor is thereafter regenerated for obtaining a fresh soda liquor for digestion, but before the regeneration process is carried out a substantial quantity of soap formed by fatty and resinous acids present in the wood is scummed off. This soap is treated with mineral acids for liberating and precipitating said fatty and resinous acids. The precipitated product often called tall-oil (tall-acid) or liquid resin is thereafter subjected to distillation, generally under a vacuum, whereby first the fatty acids and then the resinous acids are distilled. The remaining distillation residue obtained therefrom, which is solid and thermoplastic and dark in colour may be employed in the emulsion according to the invention. Contrary to liquid resin and the distillation products obtained therefrom, to wit, fatty and resinous acids, only part of said pitchy residue can be saponified. In the market there is thus a distillation residue, which needs only the incorporation of caustic soda 4% by weight on the basis of the residue in question, for effecting a complete saponification. Liquid resin and resinous acids generally overtly marketed need on the other hand an addition of 8–12% caustic soda for enabling a complete saponification thereof.

The protective colloid employed in the emulsion according to the invention may comprise one or more of the following substances, alkali caseinate, resinous emulsions, resinous soaps, various colloidal substances such as gelatin, bone-glue, blood-glue, casein hardened with formalin and starch, colloidal clays such as bentonite, gilsonite, besides water glass and silicon-dioxide gel.

A few examples will now be given of an emulsion according to the invention, both with and without the above mentioned distillation residue obtained from the distillation of liquid resin.

*Example 1*

50 parts by weght of lime sludge from the sulphate process of paper pulp making are suspended in 100–150 parts by weight water so that a homogeneous suspension without clumps is obtained. To this suspension is added a solution of 1–5 parts by weight alkali caseinate and 5–20 parts by weight water, to which 0.1 parts by weight ammonia may possibly have been admixed. Before the last mentioned solution is incorporated in the lime sludge suspension it ought to be allowed to stand 15–30 minutes in order that it may assume a viscous consistency.

70–100 parts by weight heated coal tar is now stirred into the mixture of lime sludge suspension and protective colloid thus obtained. An emulsion of tar in water is then obtained which is so stable that it may be kept indefinitely without losing any of its properties. It will also stand freezing and will not break down when thawed.

An emulsion made according to the method illustrated by this example is so viscous that it will be difficult to brush or to apply a thin surface thereof onto a given object, but as it may be readily diluted with water, its consistency may be adjusted so as to be suitable for application to any object.

When the emulsion is applied to a surface it will, practically speaking, immediately adhere so tight thereto that it cannot be washed off by a substantial trickling, spraying or running of water. This is a characteristic of great importance, especially for example when it is used for roofing purposes and on exterior surfaces of structures, exposed to rain immediately after the application of the emulsion. The emulsion will also adhere to damp or moist surfaces which is also a great advantage when used for coating damp or moist foundation walls.

When the emulsion has dried it will build a hard uniform surface impermeable to the effects of water. Thanks to the intimate incorporation of lime sludge the emulsion will harden immediately after drying and thereby form a hard non-adhesive surface.

The ratio between the amount of lime sludge used and tar may vary considerably, and depends on the viscosity of the tar employed, certain properties of the sludge and on the properties desired in the finished surface.

Thus if the tar is viscous, e. g., so called generator tar, a relatively smaller quantity of sludge, e. g., 30 parts sludge for 70 parts tar may be used. If the tar is thinner a quantity of up to so much as 50 parts sludge for 50 parts tar may be used.

When bituminous substances that are viscous at normal temperatures, are incorporated as a component part of emulsions, it is generally advantageous to make the bituminous substances more flowable, and this may be effected by dissolving them in a solvent or by heating them. In case heating the bituminous substance, the lime sludge suspension is preferably heated to a corresponding temperature. In certain cases it may then be necessary to prepare the emulsions under pressure, especially if temperatures exceeding 100° C. are used.

*Example 2*

The following is an example of an emulsion prepared under heat.

Into a suspension comprising 15 parts by weight of lime sludge in 40 parts by weight water containing 3 parts by weight alkali caseinate, heated to a temperature of 70° C. is stirred a mixture of 42 parts by weight molten asphalt. An emulsion prepared in this way is very suitable for coating purposes when a glossy cohesive surface is desired.

*Example 3*

An emulsion in which the bituminous substance consists of the distillation residue obtained from the distillation of liquid resin, may, for example be prepared in the following way:

5 parts by weight lime sludge are suspended in 10-15 parts by weight water forming a homogeneous suspension without clumps. To this suspension is incorporated a solution of 0.1-0.5 parts by weight alkali caseinate and 0.5-2 parts by weight water; the last mentioned solution may possibly be slightly ammoniacal and ought to be allowed to stand 15-30 minutes before it is added to the suspension so that it may assume watery or flowable consistency.

In the mixture of lime sludge suspension and protective colloid thus obtained is then stirred 7-10 parts by weight of said pitchy residue obtained from the distillation of liquid resin, and after first having been dissolved in any suitable volatile solvent, so that a relatively watery or flowable and readily emulsifiable product is obtained. One then has an emulsion of the said residue in water. The emulsion prepared in this way is stable and if desired colouring means may be incorporated therein so that the emulsion may be used as a paint.

*Example 4*

An emulsion in which two bituminous substances are used, of which substances one consists of the above mentioned distillation residue from the distillation of liquid resin may be prepared in the following way:

5 parts milk casein is suspended in 46.5 parts water and to the suspension obtained thereby is added approximately two parts concentrated ammonia, i. e., sufficient to adjust the pH-value of the alkali caseinate solution formed to above 7. The solution is then heated to 70° C. and vigorously stirred for 5 minutes. Thereafter the 46.5 parts of above mentioned residue from the distillation of liquid resin in heated to melting point, i. e., to about 150° C. and thereafter incorporated in the alkali caseinate solution. During the incorporation of the above mentioned residue the suspension is stirred at first slowly and thereafter more vigorously. The pitchy residue is thereby emulsified by the casein solution and forms the internal phase of the emulsion. After the incorporation process the emulsion will have a temperature of about 100° C.

To this emulsion is then added 250 parts by weight wood tar heated to 50-60° C., i. e., until it has become readily flowable. The said tar is poured into the emulsion in a continuously increasing stream, during which the suspension is vigorously stirred. 150 parts lime sludge comprising 80% dry substance is thereafter incorporated. Finally 25 parts water are admixed.

This emulsion which contains about 20% water may readily and without adverse effect be diluted with water, if necessary, even until the water content is 30-40% of the emulsion.

The ratio between the quantity of tar and the quantity of pitchy residue may vary considerably. The greatest value this ratio may have is about 10, whereas the smallest ratio is unlimited. If the ratio is decreased, however, the hardness of the coating will be less.

The ratio between the quantity of casein and the quantity of tar ought generally to be at least about 1:5. This ratio may be increased practically to an unlimited extent but the quantity of casein ought preferably not to be excessively large, as this will act adversely on the breaking down of the emulsion. An excessive quantity of casein entails also the disadvantage that the coating formed after the drying of the emulsion may re-emulsify if the underlying surface is or becomes damp.

Instead of using the casein in the above examples one may, for example, use a mixture of bone-glue and sulphite waste liquor or any one or more of the above mentioned protective colloids. If the pitchy residue obtained from the distillation of liquid resin should comprise a relatively large quantity of resinous acids or fatty acids, the said pitchy residue may be employed alone as a protective colloid.

If, as in the last mentioned example, alkali must be added, it is generally preferably to choose a volatile alkali so that it may evaporate simultaneously with the water during the drying of the emulsion.

The tar used in the above examples may consist of any tar, i. e., coal tar or wood tar, which latter may be prepared from any sort of wood. The wood tar may be unprepared tar containing 4-5% water. It is also possible to use so called distilled tar. In the above was to be read that if very viscous bituminous material is to be emulsified, it ought to be rendered watery or more flowable and that a solvent may be used for this purpose. Such a solvent ought preferably to be so volatile that it will readily evaporate after the application of the emulsion. Suitable solvents for this purpose are, e. g., trichlorethylene, carbon tetrachloride or other chlorinated hydrocarbons. Such solvents besides being very volatile have the advantage of being fire proof (non-inflammable) and do not leave an evaporation residue that would otherwise make the finished coating adhesive.

If the emulsion is to be used for coating walls in closed containers or structures in spaces where there is no circulation of air, chlorinated hydrocarbons ought not to be used as a solvent. In such cases the solvent for the bituminous substances should preferably consist of xylol, petroleum-ether or any other organic solvent. The last mentioned solvents, however, have the inherent disadvantage of being rather highly inflammable.

What I claim and desire to secure by Letters Patent is:

1. A new emulsion, comprising asphalt, a precipitated calcium carbonate, and from 1 to 5% by weight of a double salt of calcium carbonate and sodium carbonate, said carbonate and double salt being coprecipitated from a paper pulp lime sludge, above components being emulsified in water containing a protective colloid.

2. A new emulsion, comprising tar, a precipitated calcium carbonate, and from 1 to 5% by weight of a double salt of calcium carbonate and sodium carbonate, said carbonate and double salt being coprecipitated from a paper pulp lime sludge, above components being emulsified in water containing a protective colloid.

3. A new emulsion, comprising a pitchy residue from the distillation of tall-oil, precipitated calcium carbonate and from 1 to 5% by weight of a double salt of calcium carbonate and sodium carbonate, said carbonate and double salt being coprecipitated from a paper pulp lime sludge, said above components being emulsified in water containing a protective colloid.

4. A new emulsion, comprising a bituminous material and a paper pulp lime sludge containing a double salt of calcium carbonate and sodium carbonate, said above components being emulsified in water containing a protective colloid.

5. A new emulsion, comprising a bituminous material and a lime sludge from the soda process of paper pulp manufacture, said lime sludge containing a double salt of calcium carbonate and sodium carbonate, said above components being emulsified in water containing a protective colloid.

6. A new emulsion, comprising a bituminous material and lime sludge from the sulphate process of paper pulp manufacture, said lime sludge containing a double salt of calcium carbonate and sodium carbonate, said above components being emulsified in water containing a protective colloid.

7. A new emulsion, comprising a bituminous material and an inert filler of a finely subdivided calcium carbonate having homogeneously incorporated therewith a double salt of calcium carbonate and sodium carbonate, said carbonate and double salt being coprecipitated from a paper pulp lime sludge, said above components being emulsified in water containing alkali caseinate.

8. A new emulsion, comprising a pitchy residue obtained from the distillation of tall-oil, another bituminous material and an inert filler of a finely subdivided calcium carbonate having homogeneously incorporated therewith a double salt of calcium carbonate and sodium carbonate, said carbonate and double salt being coprecipitated from a paper pulp lime sludge, above components being emulsified in water containing a protective colloid.

9. A new emulsion, comprising a pitchy residue obtained from the distillation of tall-oil, another bituminous material, and an inert filler of a finely subdivided calcium carbonate having homogeneously incorporated therewith a double salt of calcium carbonate and sodium carbonate, said carbonate and double salt being coprecipitated from a paper pulp lime sludge, above components being emulsified in water containing alkali caseinate.

10. A new emulsion, comprising a pitchy residue obtained from the distillation of tall-oil and containing a relatively small proportion of saponified substances, an inert filler of a finely subdivided calcium carbonate having incorporated therewith a double salt of calcium carbonate and sodium carbonate, said carbonate and double salt being coprecipitated from a paper pulp lime sludge, above components being emulsified in water containing said saponified substances.

11. A new emulsion, comprising a pitchy residue obtained from the distillation of tall-oil, said pitchy residue containing a relatively small quantity of saponified substances, another bituminous material, and an inert filler of a finely subdivided calcium carbonate having incorporated therewith a double salt of calcium carbonate and sodium carbonate, said carbonate and double salt being coprecipitated from a paper pulp lime sludge, said pitchy residue, said bituminous material and said calcium carbonate being emulsified in water containing said saponified substances.

12. A new emulsion comprising a bituminous material and paper pulp lime sludge having homogeneously incorporated therewith a double salt of calcium carbonate and sodium carbonate, above components being emulsified in water containing alkali caseinate, said bituminous material and said lime sludge being employed in the ratio of approximately 70–50% of the former and 30–50% of the latter.

13. A new emulsion comprising a bituminous material and a paper pulp lime sludge having homogeneously incorporated therewith a double salt of calcium carbonate and sodium carbonate, above components being emulsified in water containing an alkali caseinate, said sludge material and said alkali caseinate being employed in the ratio of approximately 50 parts by weight of sludge, 70 to 100 parts of bituminous material and 1 to 5 parts of alkali caseinate, the remainder of the emulsion being substantially all water, in a total of 226 to 325 parts for the emulsion.

14. A new emulsion according to claim 2, in which the water content is 20% by weight of the total weight of the emulsion.

15. A new emulsion as in claim 4, in which the pH-value is more than 7.

16. A new emulsion as in claim 4 in which the pH-value is adjusted to more than 7 by an addition of ammonia.

17. A new emulsion comprising a pitchy residue obtained from the distillation of tall-oil and containing a relatively small quantity of saponifiable substances, an inert filler of a finely subdivided calcium carbonate having homogeneously incorporated therewith a double salt of calcium carbonate and sodium carbonate, said carbonate and double salt being coprecipitated from a paper pulp lime sludge, all above components being emulsified in water, said saponifiable substances in the pitchy residue being saponified by means of ammonia and dissolved in said water.

18. A new emulsion as in claim 10 in which the ratio between the saponifiable components in the said pitchy residue and the non-saponifiable components in said pitch are such as will permit complete saponification on the addition of 4% caustic soda based on the pitch.

19. A new emulsion as in claim 4 in which the particles in the paper pulp lime sludge are preponderantly of colloidal size.

20. A new emulsion as in claim 4 in which the particles in the paper pulp lime sludge are preponderantly of a size ranging from 0.1–2.0 m$\mu$ in diameter.

21. A new emulsion as in claim 4 in which the quantity of double salt in the paper pulp lime sludge ranges from about 1–5%.

22. A new emulsion as in claim 4 in which the quantity of double salt in the paper pulp lime sludge is about 2.5%.

23. A new emulsion comprising a bituminous material dissolved in a solvent, an inert filler of a fine grain calcium carbonate having homogeneously incorporated therewith a double salt of calcium carbonate and sodium carbonate, said carbonate and double salt being coprecipitated from a paper pulp lime sludge, the solution formed by said bituminous material and said solvent, and said calcium carbonate being emulsified in water containing a protective colloid.

SIXTEN MAGNUS HJELTE.

REFERENCES CITED

The following references are of record in the file of this patent:

UNITED STATES PATENTS

| Number | Name | Date |
| --- | --- | --- |
| 2,047,258 | Ernotte | July 14, 1936 |
| 2,040,208 | Lacau | May 12, 1936 |
| 2,040,115 | Watts | May 12, 1936 |
| 1,859,517 | Kirschbraun | May 24, 1932 |
| 812,593 | Preaubert et al. | Feb. 13, 1906 |
| 366,609 | Rennyson | July 12, 1887 |

FOREIGN PATENTS

| Number | Country | Date |
| --- | --- | --- |
| 424,494 | Great Britain | Feb. 14, 1935 |
| 499,352 | Great Britain | Jan. 23, 1939 |